United States Patent Office 3,468,976
Patented Sept. 23, 1969

3,468,976
ACRYLATE ELASTIC THREADS AND FILMS
Hideyasu S. Yanai, Moorestown, N.J., and Lore Jungster, Langhorne, Pa., assignors to Rohm & Haas Company, Philadelphia, Pa., a corporation of Delaware
No Drawing. Filed Sept. 8, 1966, Ser. No. 577,798
Int. Cl. C08f 19/00
U.S. Cl. 260—883        12 Claims

ABSTRACT OF THE DISCLOSURE

Elastomeric materials and methods of producing them comprising an elastomeric "backbone" polymer (50–90 wt. percent) and a reinforcing material (50–10 wt. percent). The backbone is produced by copolymerizing (1) an alkyl ($C_2$–$C_8$) acrylate (75–99.5 wt. percent of backbone); (2) an unsaturated monomer for cross-linking the backbone by a subsequent condensation reaction e.g. N-methylolmethacrylamide (0.1–5 wt. percent); and (3) optionally, an unsaturated hardener monomer, e.g. acrylamide (up to 20 wt. percent). The reinforcing material is a polymer of at least 90 wt. percent of a carboalkoxyphenyl acrylate, e.g. p-carbomethoxyphenyl acrylate. Preferably the elastomeric materials may be spun into fibers or extruded into films.

---

This invention relates to novel elastomeric materials and to shaped structures, particularly films and threads, prepared therefrom.

Acrylic elastomers have been available commercially for a number of years. These materials are particularly noted for heat resistance, flex life and resistance to oil. However, they have also been characterized by poor tensile strength and poor return modulus. Recently there have been developed novel acrylic elastomer fibers characterized by the combination of superior resistance to ultra-violet, aging, chlorine, organic solvents, etc., combined with high tensile strength, high return modulus and low set characteristics. Such materials combine many of the desirable properties of spandex materials with the superior properties of acrylic elastomers. These superior acrylic elastomers are produced by a combination of controlled cross-linking of the acrylic elastomer with reinforcement by a polyvinyl halide, particularly polyvinylidene chloride. These polymers are disclosed in United States patent application Ser. No. 372,476 filed on June 4, 1964, by Robert G. Minton and Sidney Melamed, and now abandoned. United States patent application Ser. No. 655,707 filed on June 15, 1967, is a continuation-in-part of the aforesaid abandoned case.

While the elastomeric polymers invented by Minton and Melamed are premium elastomeric materials having superior properties as described, they continue to be characterized by sensitivity to high temperatures; i.e., exposure to high temperatures causes extensive discoloration of the elastomer. As high temperatures are normally encountered in processing fibers as in processing fibers as in curing, dyeing, boarding, heat setting, etc., the use of the elastomer of Minton and Melamed in fabrics requiring such processing renders the processing steps highly critical and necessitates close control to prevent scorching of the fabric. Moreover, in addition to complicating the problem of factory control in processing such fabrics, the presence of the elastomers also reduces the safe ironing temperature of the fabrics.

It has now been found that an acrylic elastomer similar to that of Minton and Melamed can be produced by using as the reinforcing material a monomer selected from the group consisting of the o- or p-carboalkoxyphenyl acrylates wherein the alkoxy group is either methoxy or ethoxy. Thus, the synthetic elastomeric materials of the invention comprise:

(A) About 50–90% by weight of a base elastomeric composition as a "backbone" or main component formed of a copolymer comprising:
(1) About 75–99.9% by weight of the base composition of at least one monomer polymerizable to give a rubbery polymer and selected from the group consisting of alkyl ($C_2$–$C_8$) acrylates, and mixtures thereof with each other and with up to an equal weight amount of ethylene, propylene, and/or isobutylene; and
(2) From about 0.1 to 5% by weight of the base composition of at least one $\alpha,\beta$-monoethylenically unsaturated monomer copolymerizable with (1) and effective to cross-link said base composition by a reaction which is triggered separately from the polymerization reaction; and
(B) About 50–10% by weight of a reinforcing material for the base composition and dispersed throughout the base composition comprising a polymerized mixture containing at least 90% by weight of at least one monomer selected from the group consisting of p-carbomethoxyphenyl acrylate, p-carboethoxyphenyl acrylate, o-carbomethoxyphenyl acrylate and o-carboethoxyphenyl acrylate.

The elastomeric materials of the invention are prepared from an aqueous dispersion of a mixture of the base composition and of the reinforcing material by coagulating the dispersion. In one embodiment, such a mixture is prepared mechanically by physical admixture of separate dispersions of the base composition and of the reinforcing material. It is preferred to prepare the synthetic elastomeric material by a sequential polymerization in which either a mixture of the monomers used in preparing the reinforcing material is polymerized in an aqueous dispersion of the base composition or the mixture of monomers used in preparing the base composition is polymerized in an aqueous dispersion of the reinforcing material, thus forming a "chemical mixture."

If desired, successive polymerizations may be carried out on the same dispersion. Thus, if desired, after preparation of the latex mixture by sequential polymerization or physical admixture as described, a fresh portion of the monomers in A (or B) may be polymerized on the latex followed, if desired, by a fresh portion of the monomers of B (or A). In addition to carrying out such successive polymerizations utilizing the monomers embraced in A and B, other monomers may be polymerized on the latex in a subsequent (i.e., tertiary or later) polymerization in addition to, or in place of, such monomers to impart specific properties thereto. Thus, a monomer or monomers containing hydroxyl, carboxyl or other functional groups may be polymerized thereon to impart dyeability or other specific properties without departing from the scope of the invention, or a preformed polymer of such a monomer may be added to the latex.

If desired, a small portion of the acrylate monomer constituting the principal component of the backbone may be replaced by a suitable monomer copolymerizable therewith which does not interfere with the elasticity thereof. Generally, such monomers are themselves acrylates or methacrylates whose homopolymers display some elasticity. Thus, if desired, a minor amount, say about 5% by weight of the principal alkyl acrylate, may be replaced with methyl acrylate or 2-ethylhexyl methacrylate, etc., without departing from the invention.

Optionally, the backbone copolymer contains one or more $\alpha,\beta$-monoethylenically unsaturated monomers, which monomers are effective to increase the glass transition temperature of the copolymer. (For the method of determining the glass transition temperature of a polymer, see D. G. Bannerman and E. E. Magat, page 288 in Polymer Processes, C. E. Schildknecht ed., Interscience Publishers Inc., 1956). Monomers having this effect on the coolymer are termed "hardeners." Any monomer whose homopolymer is hard and non-elastic at 50° C. may be used. Thus, those monomers are included whose homopolymers are highly crystalline and possess a high melting point, such as polyvinylidene chloride, and also those monomers whose homopolymers possess a high glass transition temperature. Suitable hardeners include vinylidene chloride, vinyl chloride, acrylonitrile, vinyl pyridine, methacrylonitrile, methyl methacrylate, styrene, vinyl toluene, ethyl methacrylate, acrylic acid, methacrylic acid and itaconic acid. When an acid is used as the hardener, it should not constitute more than 5% by weight of the copolymer. Because of their relative temperature sensitivity, it is preferred not to use the halogen-containing hardeners.

Some of the monomers useful as cross-linkers are also effective as hardeners. According to one embodiment of the invention, such monomers are used in preparing the backbone copolymers in amounts greatly in excess of that needed to achieve cross-linking. The cross-linking reaction is then controlled so that only a portion of the available cross-linking monomer units are utilized for such crosslinking, the portion of the monomer units not utilized in the cross-linking being retained in the polymer to function as a hardener. In addition to acting as hardeners, such residual monomer units may also improve dyeing and, in some cases, increase the stability of the resulting sequential copolymers. Further, where the novel latex of the invention is used in a coating composition, such monomer units may improve the adhesion of the coatings to a variety of substrates.

The amount of hardener which may be used in preparing the backbone copolymer will vary with the nature of the hardener or hardeners; i.e., the rubbery monomer or monomers, and on the properties desired in the product. In general, the hardener should not constitute over about 20% by weight of the backbone copolymer, and preferably not over about 15%. When the rubbery monomer itself produces a backbone copolymer having a sufficiently high glass transition temperature, no hardener need be used. Thus, when ethyl acrylate is used for the rubbery monomer, no hardener is generally needed.

The monomers used to cross-link the backbone copolymers comprise from about 0.1 to 5% by weight of the copolymer. Although no more than about 0.1–2% by weight of the backbone may be used in the cross-linking reaction, the use of excess amounts of the cross-linking monomer in preparing the backbone copolymer is advantageous in making possible more rapid curing, in providing reaction groups in the resulting product which improve the dye receptivity and other properties of the polymer, and in acting as hardeners as described above. When excess cross-linker is present, care must be taken during curing to prevent excessive cross-linking which would be detrimental to the elasticity of the copolymers. The monomers effective as cross-linkers are monomers containing only one vinyl group copolymerizable with the alkyl acrylates together with one or more groups effective to crosslink the copolymer by means of a reaction which is triggered separately from the polymerization reaction. Vinyl monomers containing a group capable of undergoing a condensation reaction such as amide, alcoholic hydroxyl, carboxylic acid, ureido, epoxy, etc. may be used. Other condensation-type cross-linking systems may be used such as methoxymethyl vinyl sulfide, etc. Other side chain cross-linking systems analogous to the condensation systems may be used. Thus, unsaturated linkages pendant to the polymer chain may be used in coupling reactions by addition as in vinyl crotonate. A more detailed description of cross-linkable monomers suitable for use herein is set forth in the aforesaid application of Minton and Melamed.

These monomers may be used alone or in combination. Suitable combinations of reactive cross-linking monomers result in a copolymer which is self-curing; that is, the two types of reactive groups present in the copolymer react with each other to cure the copolymer. Thus, methacrylamide, acrylamide, and/or 4-pentenamide with one or more of the corresponding N-methylol derivatives, hydroxyethyl acrylate with itaconic acid, glycidyl methacrylate with methacrylic acid and/or hydroxypropyl methacrylate, etc., are examples of such combinations of cross-linking monomers. If desired, a single cross-linking monomer may be used which requires that the copolymer be treated with an additional chemical reagent to effect cure. Thus, when an amide as acrylamide, and/or methacrylamide is used as the sole cross-linking agent, the polymer must be treated with a chemical such as glyoxal, $\alpha$-hydroxyadipaldehyde, other dialdehydes, formaldehyde or a formaldehyde-yielding material. Formaldehyde-containing polymer-forming materials such as urea-formaldehyde or melamine-formaldehyde condensates may also be used. A single monomer which is self-condensing may also be used, such as the N-methylol derivatives of acrylamide, methacrylamide, 4-pentenamide, etc. Combinations of the same type of reactive monomer may also be used. Thus, N-methylolmethacrylamide and N-methylol-4-pentenamide may be used, or glycidyl methacrylate with hydroxypropyl methacrylate and methacrylic acid, or N-methylolacrylamide with N-acetoxyacrylamide, or hydroxyethyl methacrylate with methacrylic acid and itaconic acid, etc. Mixed cross-linking systems may also be used with a mechanical mixture of latexes for the backbone. Thus, one latex of butyl acrylate-glycidyl methacrylate may be mixed with a latex of butyl acrylate-methacrylic acid and then the o- or p-carboalkyoxyphenyl acrylate polymerized on the mixed latex or a latex thereof added to the mixed-backbone latex. Such a system simplifies the handling of the more reactive cross-linking combinations.

The reinforcing material is an o- or p-carboalkoxyphenyl acrylate as described. These materials give polymers having a highly ordered tactic structure. In general, the order of crystallinity varies from the methoxy (highest) to the ethoxy (lowest) and from the para (highest) to the ortho (lowest). The presence of other comonomers reduces the crystallinity of the resulting copolymer. In general, the presence of more than about 10% of comonomer with the carboalkoxyphenyl acrylate results in a product with little or no crystallinity. This figure of about 10% is very approximate and the precise amount will vary considerably either above or below this amount, depending on the nature of the comonomer or monomers. For optimum utility as a reinforcing agent the reinforcing polymer should be crystalline or at least highly ordered and tactic. It is preferred to use the p-carbomethoxyphenyl acrylate which is the most crystalline of materials and to modify the crystallinity of the material by the addition of 0.5 to 5% by weight of one or more comonomers. Preferably the comonomer(s) not only modifies the crystallinity but also contains a reactive group (as acrylic acid) which promotes bonding with the elastomer and/or dyeability, spinnability, etc. In general, the same monomers useful either as cross-linkers or as hardeners with the elastomer are useful for this purpose as comonomers for the reinforcing material.

Both the elastomer and the reinforcing material are prepared by emulsion polymerization using a free radical catalyst. The art of emulsion polymerization is well-known and the conditions of polymerization used herein are not critical. These aqueous dispersions may be made by using one or more emulsifiers of anionic, cationic or nonionic type. Mixtures of two or more emulsifiers, regardless of type, may be used except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the use of emulsifier is often unnecessary and this, or the use of only a small amount; e.g., less than about 0.5% of emulsifier, may sometimes be desirable from the cost standpoint.

The free radical catalyst may be either water-soluble or oil-soluble. The invention contemplates the use of any of the free radical catalysts known to the art as effective to catalyze the polymerization of the monomers used herein. Particularly preferred are the peroxy catalysts and the azo-type catalysts. Typical catalysts which may be used are peroxides, such as hydrogen peroxide, dibutyl peroxide, acetyl peroxide, benzoyl peroxide; alkyl percarbonates; hydroperoxides, such as t-butylhydroperoxide, cumene hydroperoxide, p-methane hydroperoxide, etc.; perborates, as the alkali metal and ammonium perborates; persulfates, as the alkali metal and ammonium persulfates; etc. Other catalysts, such as $\alpha,\alpha'$-azodiisobutyronitrile, diazoaminobenzene, etc., can be used. The quantity of the catalyst used can be varied, depending on the monomer, the temperatures and the method of addition. Generally from about 0.001 to 5% by weight, based on the weight of the monomers, is used. If desired, catalyst may be omitted and ultraviolet radiation used for the polymerization, preferably with an activator.

The catalyst may be used with a redox system. A buffer may be used for either or both stages of the polymerization. The catalyst, emulsifier and monomer charge may all be added incrementally as polymerization proceeds. One type of catalyst and/or emulsifier may be used in the polymerization of the backbone copolymer and a different catalyst and/or emulsifier used for the polymerization of the reinforcing material, or the same catalyst and/or emulsifier may be used for both polymerizations, as desired.

The temperature of polymerization is not critical and may be varied at the choice of the operator. Where a temperature below 0° C. is used, a freezing point depressant, as ethylene glycol, should be added to the water. The polymerization may be conducted at atmospheric pressure or with the application of high pressures. The choice of the monomers will influence the choice of the pressure to be used.

It is preferred that any residual monomer remaining after the first polymerization be at a minimum. The spinning, curing, and stretching of fibers and/or films from the reinforced latexes herein described are precisely as set forth in application Ser. No. 372,476 described above and these disclosures are incorporated herein by reference thereto. As is well known, the aqueous dispersion of reinforcing material resulting from such emulsion polymerization contains particles having a diameter substantially less than one micron.

While the novel polymers have been described principally in fabricating fibers and films, they have a variety of other useful applications. Thus, they may be used as protective coatings for wood, metal, etc.; coatings for paper, leather, textiles, etc.; gaskets; mechanical goods; binders for non-woven textiles; in producing foams; and in other applications where rubber latexes have been found useful. The excellent textile strength and elasticity of the products of the invention coupled with their superior resistance to solvents, chlorine and peroxide bleaches, ultraviolet, etc., characterize these products as superior materials for such uses.

To assist those skilled in the art to practice the present invention, the following modes of operation are suggested by order of illustration. All parts are by weight unless otherwise indicated.

Example 1

A 50 cc. round bottom flask was charged with 16 cc. deionized water, 0.16 g. sodium lauryl sulfate, and 8 g. p-carbomethoxyphenyl acrylate. The flask was heated to 75° C. under nitrogen and 0.8 cc. 1% aqueous potassium persulfate were added. Polymerization was conducted for five hours. The polymer isolated by evaporating a portion of the emulsion was highly crystalline and had a melting point of 200° to 204° C.

To 20 g. of this emulsion were added 20 cc. water, 11.1 g. 10/1 butyl acrylate/acrylonitrile mixture, 1.0 g. aqueous solution containing 0.2 g. methacrylamide and 0.2 mole formaldehyde/mole methacrylamide. The polymerization was catalyzed at room temperature by the addition of 0.27 cc. 2% aqueous solution of sodium formaldehyde sulfoxylate and 0.3 cc. 2% ammonium persulfate. Three hours later an additional .05 cc. ammonium persulfate solution and .04 cc. sodium formaldehyde sulfoxylate solution were added. Conversion was 97%.

The emulsion was extruded through a 12 mil jet into a concentrated hydrochloric acid bath and the fiber cured for one hour at 100° C. The fiber was crystalline in the X-ray, showed good elasticity, and had approximately twice the tenacity of a fiber prepared from the butyl acrylate copolymer in the absence of the poly(p-carbomethoxyphenyl acrylate) without sacrifice in elongation. A further increase in tenacity with some loss of elongation could be achieved by stretching the air-dried fiber 200% followed by heating ½ minute at 200° C.

Example 2

A copolymer of butyl acrylate/acrylonitrile/methylolmethacrylamide/methacrylamide in the ratios of 89.2% butyl acrylate, 8.8% acrylonitrile, 2% methacrylamide, and 0.2 mole formaldehyde/mole of methacrylamide was prepared in emulsion at 30% solids using 4.25% sodium lauryl sulfate as the emulsifier and the redox pair of ammonium persulfate/sodium formaldehyde sulfoxylate as catalyst. Fifty g. of the above emulsion was placed in a stirred reactor, adjusted to pH 7.5 with sodium carbonate, 13 cc. of deionized water and 6.5 g. of p-carbomethoxyphenyl acrylate were added, the emulsion was heated under a stream of nitrogen to 75° C., 0.65 cc. 1% potassium persulfate was added and heating continued for six hours at 75° C. An additional 0.65 cc. 1% potassium persulfate was then added and heating continued eight hours. Overall conversion to polymer was 99%.

Fiber was spun from the emulsion by coagulation into a bath containing concentrated hydrochloric acid. The fiber was cured for one hour at 100° C. A control fiber was prepared from the same butyl acrylate/acrylonitrile/methacrylamide copolymer with formaldehyde using the same conditions, but omitting the poly(p-carbomethoxyphenyl acrylate). The fiber reinforced by the poly(p-carbomethoxyphenyl acrylate) had approximately twice the tenacity of fiber made from the unfilled butyl acrylate polymer without sacrifice in elongation. Moreover, the fiber reinforced by the poly(p-carbomethoxyphenyl acrylate) had substantially better resistance to discoloration upon heating than a similar fiber reinforced by poly(vinylidene chloride).

Example 3

An emulsion polymer was prepared from p-carboethoxyphenyl acrylate by emulsifying 15 g. of the monomer in 45 g. water containing 0.45 g. sodium lauryl sulfate, 3 drops dioctyl sodium sulfoscuccinate and 3 drops morpholine oleate. One and one-half cc. 1% potassium persulfate was added and polymerization conducted at 80° C. for 16 hours. Polymer conversion was 97%. Butyl acrylate/acryonitrile/methylolmethacrylamide was polymerized in aqueous emulsion in the presence of the poly (p-carboethoxyphenyl acrylate) using the same ratios and conditions for the rubbery phase as in Example 1. The ratios of rubbery components to hard components; i.e., polybutyl acrylate/acrylonitrile/methylolmethacrylamide to poly(p-carboethoxyphenyl acrylate) was 70 to 30 by weight. The emulsion was wet-spun through a 12 mil capillary into concentrated hydrochloric acid and drawn into fiber. After curing for one hour at 100° C., the fiber, which exhibited good elasticity, had about twice the tenacity of the fiber spun in the absence of poly(p-carboethoxyphenyl acrylate) and retained about 80% of the elongation.

Example 4

An emulsion polymer was prepared from butyl acrylate/acrylonitrile/methylolmethacrylamide in the ratio of 88.2/9.8/2.0 using 4.25% sodium lauryl sulfate as the emulsifier and ammonium persulfate, sodium formaldehyde sulfoxylate and t-butyl hydroperoxide as the initiators. Fifty g. of the above polymer emulsion containing 15.2 g. polymer was adjusted to pH 7 and the following were added: 0.15 g. sodium lauryl sulfate in 13 cc. water, 6.5 g. p-carboethoxyphenyl acrylate, and 0.65 cc. 1% potassium persulfate. The emulsion was heated for 8 hours under nitrogen with agitation. Polymer conversion was 99.7%. The emulsion was spun through a 12 mil jet into concentrated hydrochloric acid and the resultant fiber cured for one hour at 100° C. The fiber had twice the tenacity of the fiber containing no poly(p-carboethoxyphenyl acrylate) with little loss in elongation. The tenacity could be doubled with some sacrifice in elongation by heating the air-dried fiber for one minute at 150° C. while stretched 200% of its initial length.

Example 5

A blend containing 70 parts poly(butyl acrylate/acrylonitrile/methylolmethacrylamide) in the ratio of 89.2/8.8/2.0 and 30 parts poly(p-carbomethoxyphenyl acrylate) was prepared by mixing 37.5 g. of an emulsion containing 11.3 g. of the butyl acrylate copolymer and 20 g. of an emulsion of the poly(p-carbomethoxyphenyl acrylate) containing 4.85 g. of the polymer. The emulsion blend was spun into concentrated hydrochloric acid, the fiber cured one hour at 100° C. to yield a tenacity double that of the fiber containing no poly(p-carbomethoxyphenyl acrylate) without any loss in elongation and with retention of good elasticity. A further increase in tenacity with some loss of elongation could be achieved by stretching the air-dried fiber 200% and heating to 200° C. for 30 seconds.

What is claimed is:
1. A synthetic elastomeric material comprising:
  (A) About 50 to 90% by weight of an elastomeric backbone copolymer derived from a monomer mixture comprising:
    (1) about 75–99.9% by weight of the monomer mixture of at least one monomer polymerizable to give a rubbery polymer and selected from the group consisting of alkyl ($C_2$–$C_8$) acrylates and mixtures thereof with each other; and
    (2) from about 0.1 to 5% by weight of the monomer mixture of at least one monomer having a single unsaturated carbon-to-carbon linkage of sufficient reactivity to copolymerize with A(1) and a radical effective to cross-link said composition by a condensation reaction; and
    (3) up to about 20% by weight of the monomer mixture of at least one $\alpha,\beta$-monoethylenically unsaturated monomer effective to increase the glass transition temperature of the backbone, the homopolymer of said monomer being hard and non-elastic at 50° C.,
  said monomer mixture being selected so that the backbone polymer produced from said mixture has a second order transition temperature of no more than 0° C., and
  (B) About 50 to 10% by weight of a reinforcing material for the backbone polymer and dispersed throughout said backbone polymer consisting of a polymer of:
    (1) at least one carboalkoxyphenyl acrylate selected from the group consisting of p-carbomethoxyphenyl acrylate, o-carbomethoxyphenyl acrylate, p-carboethoxyphenyl acrylate and o-carboethoxyphenyl acrylate, and
    (2) up to 10% by weight of the reinforcing material of at least one $\alpha,\beta$-monoethylenically unsaturated monomer copolymerizable with the carboalkoxyphenyl acrylate;
  the backbone being crosslinked to solvent-resistant condition by virtue of the condensation reaction of A(2).

2. An elastomeric material according to claim 1 wherein A(1) is ethyl acrylate, propyl acrylate, or butyl acrylate.

3. An elastomeric material according to claim 2 wherein B is a homopolymer of the carboalkoxyphenyl acrylate.

4. A process for producing an elastomeric sequential copolymer comprising:
  (A) In the presence of an effective amount of a free radical catalyst, polymerizing an emulsion of:
    (1) about 75 to 99.9% by weight of at least one monomer polymerizable to give a rubbery polymer and selected from the group consisting of alkyl ($C_2$–$C_8$) acrylates and mixtures thereof with each other with
    (2) at least about 0.1% by weight of at least one monomer having a single unsaturated carbon-to-carbon linkage of sufficient reactivity to copolymerize with A(1) and a radical effective to crosslink the copolymer by a condensation reaction to produce a latex of a backbone copolymer, and
    (3) up to about 20% by weight of the monomer mixture of at least one $\alpha,\beta$-monoethylenically unsaturated monomer effective to increase the glass transition temperature of the backbone, the homopolymer of said monomer being hard and non-elastic at 50° C.,
  the monomers forming the copolymer being selected so that the polymer produced therefrom has a second order transition temperature of no more than 0° C.;
  (B) Adding to said latex a reinforcing material of
    (1) at least one carboalkoxyphenyl acrylate selected from the group consisting of p-carbomethoxyphenyl acrylate, o-carbomethoxyphenyl acrylate, p-carboethoxyphenyl acrylate, and o-carboethoxyphenyl acrylate, and
    (2) up to 10% by weight of the reinforcing material of at least one $\alpha,\beta$-monoethylenically unsaturated monomer copolymerizable with the carboalkoxyphenyl acrylate; and
  (C) Polymerizing the reinforcing material on the backbone copolymer in the presence of an effective amount of a free radical catalyst, the copolymer constituting from about 50 to 90% by weight of the total polymer.

5. A process according to claim 4 wherein is ethyl acrylate, propyl acrylate, or butyl acrylate.

6. A process according to claim 5 wherein the reinforcing material is a single carboaloxyphenyl acrylate.

7. A process for producing an elastomeric sequential copolymer comprising:
  (A) In the presence of an effective amount of a free radial catalyst, polymerizing an emulsion of
    (1) at least about 90% by weight of at least one carboalkoxyphenyl acrylate selected from the group consisting of p-carbomethoxyphenyl acrylate, o-carbomethoxyphenyl acrylate, and o-carboethoxyphenyl acrylate with
    (2) up to about 10% by weight of at least one $\alpha,\beta$-monoethylenically unsaturated monomer copolymerizable with the carboalkoxyphenyl acrylate, the resulting copolymer being highly ordered and tactic thereby producing a reinforcing latex;
  (B) Adding to said latex a monomer mixture comprising:
    (1) a monomer polymerizable to give a rubbery polymer selected from the group consisting of at least one $C_2$-$C_8$ alkyl ester of acrylic acid or a mixture of one or more of said esters and (2) from about 0.1 to 5% by weight of the monomer mixture of at least one monomer having a single unsaturated carbon-to-carbon linkage of reactivity to copolymerize with the rubbery monomer and containing at least one radical effective to cross-link the polymer chains formed from the monomer mixture by a condensation reaction, and (3) up to about 20% by weight of the monomer mixture of at least one $\alpha,\beta$-monoethylenically unsaturated monomer effective to increase the glass transition temperature of the backbone, the homopolymer of said monomer being hard and non-elastic at 50° C., the monomer mixture being selected so that a polymer produced therefrom has a second order transition temperature of no more than 0° C.; and (C) Polymerizing said monomer mixture on the reinforcing latex in the presence of an effective amount of a free radical catalyst and under conditions designed to minimize the formation of new particles, the reinforcing latex constituting from about 65 to 10% by weight of the total composition and the monomer mixture constituting correspondingly from about 35–90% by weight of the total polymer.

8. A process according to claim 7 wherein B(1) is ethyl acrylate, propyl acrylate, or butyl acrylate.

9. A process according to claim 8 wherein the reinforcing latex is a homopolymer of a carboalkoxyphenyl acrylate.

10. An elastomeric material according to claim 2 wherein A(3) is acrylonitrile or methacrylonitrile and wherein A(2) comprises an N-methylol derivative of an $\alpha,\beta$-monoethylenically unsaturated amide.

11. An elastomeric material according to claim 5 wherein A(3) is acrylonitrile or methacrylonitrile and wherein A(2) comprises an N-methylol derivative of an $\alpha,\beta$-monoethylenically unsaturated amide.

12. An elastomeric material according to claim 8 wherein B(3) is acrylonitrile or methacrylonitrile and wherein B(2) comprises an N-methylol derivative of an $\alpha,\beta$-monoethylenically unsaturated amide.

References Cited

UNITED STATES PATENTS

| 2,879,254 | 3/1959 | Coover et al. | 260—883 |
| 2,921,044 | 1/1960 | Coover et al. | 260—884 |
| 3,055,859 | 9/1962 | Vollmert | 260—885 |
| 3,066,109 | 11/1962 | Hechtman et al. | 260—899 |
| 3,247,174 | 4/1966 | Breitenbach et al. | 260—883 |
| 3,315,012 | 4/1967 | Jorgensen et al. | 260—901 |

SAMUEL H. BLECH, Primary Examiner

JOHN T. GOOLKASIAN, Assistant Examiner

U.S. Cl. X.R.

260—885, 836, 881, 29.6, 851, 878, 476, 898, 901